(12) United States Patent
Chen et al.

(10) Patent No.: US 12,317,240 B2
(45) Date of Patent: May 27, 2025

(54) CONFIGURATION OF FA PPDU FOR TB PPDU

(71) Applicant: Intel Corporation, Santa Clara, CA (US)

(72) Inventors: Xiaogang Chen, Portland, OR (US);
Cheng Chen, Portland, OR (US);
Po-Kai Huang, San Jose, CA (US);
Thomas Kenney, Portland, OR (US);
Qinghua Li, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 869 days.

(21) Appl. No.: 17/317,929

(22) Filed: May 12, 2021

(65) Prior Publication Data

US 2021/0266905 A1 Aug. 26, 2021

(51) Int. Cl.
*H04W 72/0453* (2023.01)
*H04W 88/08* (2009.01)

(52) U.S. Cl.
CPC ........ *H04W 72/0453* (2013.01); *H04W 88/08* (2013.01)

(58) Field of Classification Search
CPC . H04W 72/0453; H04W 88/08; H04W 84/12; H04W 74/006; H04W 88/02; H04L 27/2603; H04L 5/001; H04L 5/0094
See application file for complete search history.

(56) References Cited

U.S. PATENT DOCUMENTS

| 2021/0144766 | A1  | 5/2021  | Kim |
| 2022/0360397 | A1* | 11/2022 | Noh ............... H04L 5/0091 |
| 2023/0198825 | A1* | 6/2023  | Park .............. H04L 5/001 370/336 |
| 2023/0276415 | A1* | 8/2023  | Ko ................ H04W 74/06 370/329 |
| 2023/0309070 | A1* | 9/2023  | Huang ............ H04W 72/21 |
| 2023/0379109 | A1* | 11/2023 | Chun ............. H04L 27/2602 |
| 2024/0080827 | A1* | 3/2024  | Hu ................ H04W 72/0453 |

(Continued)

FOREIGN PATENT DOCUMENTS

WO 2019225986 A1 11/2019

OTHER PUBLICATIONS

The extended European search report for European Application No. 22162062.8, dated Aug. 8, 2022, 12 pages.

(Continued)

*Primary Examiner* — Yu-Wen Chang
(74) *Attorney, Agent, or Firm* — East IP P.C.

(57) ABSTRACT

The disclosure provides techniques for a configuration of frequency domain aggregated (FA) physical layer protocol data unit (PPDU) for trigger based (TB) PPDUs. An apparatus for an access point (AP) includes a radio frequency (RF) interface; and processing circuitry coupled with the RF interface. The processing circuitry is configured to: encode a trigger frame to be transmitted via the RF interface to stations (STAs) communicatively connected with the AP, wherein the trigger frame includes signaling to indicate a configuration of frequency domain aggregated (FA) physical layer protocol data unit (PPDU) for at least two STAs; and decode an FA PPDU aggregated by composite trigger based (TB) PPDUs from the at least two STAs.

23 Claims, 11 Drawing Sheets

700

(56) References Cited

U.S. PATENT DOCUMENTS

2024/0106585 A1* 3/2024 Lou ...................... H04L 5/0023

OTHER PUBLICATIONS

Edward Au (HUAWEI):"Specification Framework for TGbe", IEEE Draft;11-19-1262-23-00BE-Specification-Framework-for-TGbe,IEEE-SA Mentor,Piscataway, NJ USA, vol. 802.11 EHT;802.11be, No. 23, Jan. 17, 2021, pp. 1-116.
Jonghun Han (Samsung) et al.:"Trigger Frame for Frequency-domain A-PPDU Support", IEEE Draft; 11-20-0831-01-00BE-Trigger-Frame-for-Frequency-Domain-A-PPDU-Support,IEEE-SA Mentor, Piscataway,NJ USA, vol. 802.11 EHT;802.11be, No. 1, Sep. 15, 2020, pp. 1-17.

* cited by examiner

CONFIGURATION OF FA PPDU FOR TB PPDU

TECHNICAL FIELD

Embodiments of the present disclosure generally relate to wireless communications, and particularly to configurations of frequency domain aggregated (FA) physical layer protocol data unit (PPDU) for trigger based (TB) PPDUs.

BACKGROUND

In order to meet the ever-increasing throughput requirement for a Wireless Fidelity (Wi-Fi) network, caused by applications, such as video delivery, augmented reality (AR), virtual reality (VR), and online gaming etc., the Institute of Electrical and Electronic Engineers (IEEE) 802.11 work group is working on a new release of the standard IEEE 802.11be—extremely high throughput (EHT), also known as Wi-Fi 7. An EHT/IEEE 802.11be/ Wi-Fi 7 network will achieve high throughput through a series of system features and various mechanisms.

There would be a long period that EHT devices coexist with HE devices and other legacy devices. For example, high efficiency (HE) stations (STAs) and other legacy STAs may connect to an EHT access point (AP), together with EHT STAs. In this case, it would be inefficient for the EHT AP to receive a single PPDU from each of the connected STAs.

BRIEF DESCRIPTION OF THE DRAWINGS

Embodiments of the disclosure will be illustrated, by way of example and not limitation, in the figures of the accompanying drawings, in which like reference numerals refer to similar elements.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context indicates otherwise. The phrases "A or B" and "A/B" mean "(A), (B), or (A and B)."

In order to increase throughput and improve performance of a Wi-Fi network, embodiments of the present application provides techniques for a configuration of FA PPDU for TB PPDUs in the Wi-Fi network.

The FA PPDU is a topic for Release 2 of IEEE 802.11be. The present disclosure proposes several configurations of FA PPDU for TB PPDUs and corresponding bandwidth (BW) indications in a trigger frame broadcast by an AP.

The techniques provided herein can be applied for Wi-Fi solutions, such as, in home, enterprises, Internet of Things (IoT), etc., for example, in AP products (for example, CHD AP products) and client products of the Intel®, Inc . . .

Figure 1:
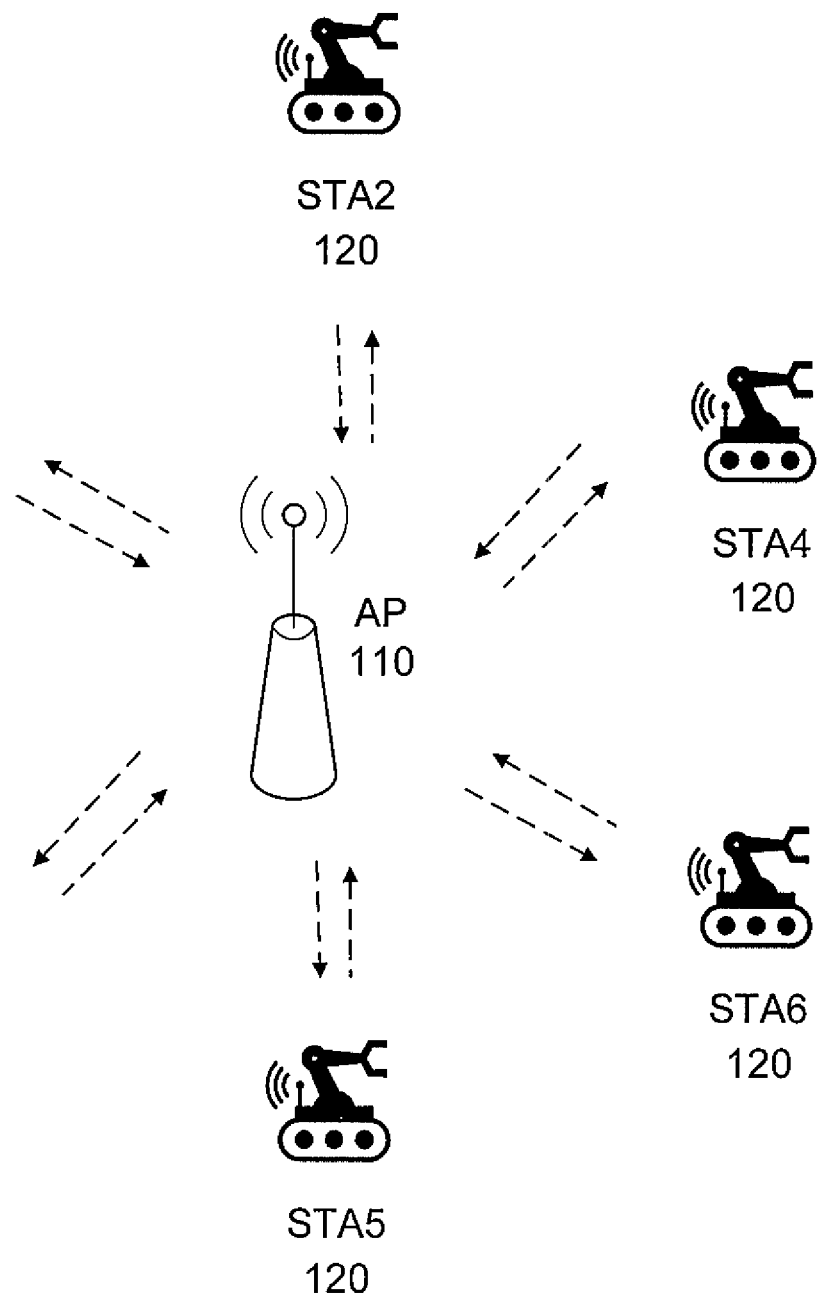
FIG. 1 shows an example Wi-Fi network, according to embodiments of the disclosure.

FIG. 1 shows an example Wi-Fi network 100, according to embodiments of the disclosure.

As shown in FIG. 1, the Wi-Fi network 100 includes an AP 110 and a plurality of STAs 120, such as, STA1, STA2, STA3, STA4, STA5 and STA6, which are communicatively connected with the AP 110, in accordance with IEEE 802.11 communication standards, such as 802.11a/b/g/n, 802.11ax and 802.11be. The STA1, STA2, STA3, STA4, STA5 and STA6 are shown for ab illustrative purpose, and the Wi-Fi network 100 may include more or less STAs 120 than shown, according to actual application scenarios. The STAs 120 may be mobile devices that are non-stationary (e.g., not having fixed locations) or may be stationary devices. In some embodiments, the AP 110 and STAs 120 may include one or more function modules similar to those in the functional diagram of FIG. 9 and/or the example machine/system of FIG. 10.

For example, the AP 110 may be an EHT AP, which may have a maximum bandwidth of 320 megahertz (MHz), or any AP to which the principle of the present application may be applied, for example, a next-generation AP. The STAs 120 may include various types of STAs. Just for an illustrative purpose, the STA1 and STA2 may be EHT STAs; the STA3 and STA4 may be HE STAs; and the STA5 and STA6 may be STAs according to other legacy 802.11 standards. The EHT STAs may have a bandwidth of 160 MHz or 320 MHz, which may be called 160 MHz capable EHT STAs or 320 MHz capable EHT STAs as used herein. The HE STAs may have a bandwidth of 160 MHz, for example. The other legacy STAs may have bandwidths allowable by corresponding standards, which will not be described herein.

In an embodiment, the AP 110 may transmit (e.g., broadcast) a trigger frame to the STAs 120 to specify which of the STAs 120 is permitted to transmit a TB PPDU and allocate a corresponding resource unit (RU) for the upcoming uplink (UL) transmission. In order to allow more STAs to transmit simultaneously and so as to increase the throughput of the Wi-Fi network 100, the trigger frame may be encoded to include signaling to indicate a configuration of FA PPDU for at least two of the STAs 120. The trigger frame may specify each of the at least two of the STAs using an AID subfield (e.g., B0-B11, where "B" means a bit) in a corresponding user info field. The user info field also includes a RU allocation subfield (e.g., B12-B19) to indicate corresponding RU allocation for the corresponding STA. In some embodiments, one or more RUs may be allocated for one or more STAs.

The configuration of FA PPDU may be determined by each solicited composite TB PPDU; a bandwidth of each solicited composite TB PPDU, a PPDU type of each solicited composite TB PPDU and so forth.

As an example, a bandwidth of an FA PPDU may be divided equally into two parts, i.e., a primary part and a secondary part. For the EHT AP, the bandwidth of the FA PPDU may be set to 320 MHz, and each of the primary part and secondary part has a bandwidth of 160 MHz. Therefore, the primary part may be referred to as P160 MHz and the secondary part may be referred to as S160 MHz hereinafter.

In order to indicate the configuration of FA PPDU, several key parameters in the trigger frame may be set as follows. For example, B54 of a common info field may be set to 1 to indicate a first PPDU in the P160 MHz of the FA PPDU as a HE PPDU, or 0 to indicate the first PPDU in the P160 MHz of the FA PPDU as an EHT PPDU. For Example, B39 of a user info field may be set to 0 to indicate that an assigned RU is within the P160 MHz of the FA PPDU, or 1 to indicate that an assigned RU is within the S160 MHz of the FA PPDU. For example, an uplink bandwidth (UL BW) subfield of the common info field may be used to indicate a bandwidth of the primary part of the FA PPDU. For example, a UL BW extension subfield of a special user info field in the signaling may be used together with the UL BW subfield in the common info field to indicate a bandwidth of a solicited TB PPDU from a specified EHT STA.

Optionally, in some embodiments, another bit in the common info field in the trigger frame should be set to indicate a type of a second PPDU in the secondary frequency band of the FA PPDU, for example, B56 in the common info field may be set to 1 to indicate a second PPDU in the S160 MHz of the FA PPDU as a HE PPDU, or 0 to indicate the second PPDU in the S160 MHz as an EHT PPDU.

In order to reduce interference between the composite PPDUs aggregated in the FA PPDU, a bandwidth of a transmitting (Tx) mask may be defined to follow the UL BW extension subfield of the special user info field.

Several example configurations of FA PPDU are provided below to facilitate understanding of configurations of FA PPDU and corresponding bandwidth setting.

Configuration 1

Figure 2:
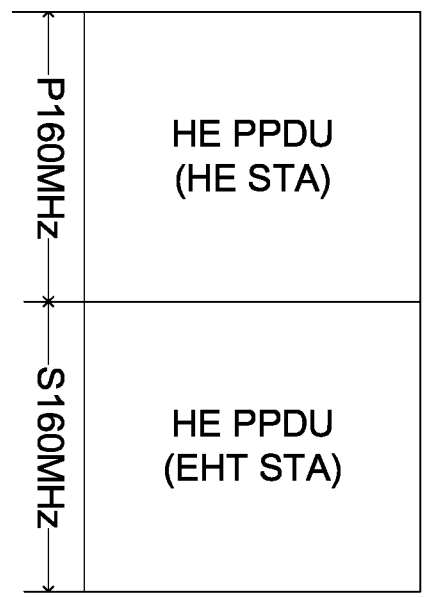
FIG. 2 shows a schematic diagram of a first configuration of FA PPDU according to embodiments of the disclosure.

FIG. 2 shows a schematic diagram of a first configuration of FA PPDU according to embodiments of the disclosure. As shown, in the first configuration, an FA PPDU may include a HE PPDU to be transmitted from a HE STA in the P160 MHz and another HE PPDU to be transmitted from an EHT STA in the S160 MHz. That is to say, the FA PPDU will be aggregated by a composite TB HE PPDU to be transmitted from the HE STA and another composite TB HE PPDU to be transmitted from the EHT STA, and both the composite TB HE PPDUs are set to have a bandwidth of 160 MHz.

In order to indicate the first configuration, the above-mentioned key parameters in the trigger frame may be set as shown in Table 1 below.

TABLE 1 key parameters in the trigger frame to indicate configuration 1

| B54 of common info field | B56 of common info field | UL BW of common info field | AID of user info field | B39 of user info field | UL BW Extension of special user info field |
|---|---|---|---|---|---|
| 1 | 1 | 160 MHz | A station identity of the HE STA | 0 | — |
|  |  |  | A station identity of the EHT STA | 1 | 160 MHz |

As shown by Table 1, B54 of the common info field, which has a value of 1, indicates that a composite PPDU to be transmitted in the primary part (P160 MHz) of the FA PPDU is a HE PPDU; B56 of the common info field, which has a value of 1, indicates that a composite PPDU to be transmitted in the secondary part (S160 MHz) of the FA PPDU is also a HE PPDU; UL BW of the common info field indicate a bandwidth of the primary part (P160 MHz) of the FA PPDU is 160 MHz; the user info field indicates that an assigned RU for the HE STA (for example, STA1 or STA2 of FIG. 1) is within the primary part (P160 MHz) of the FA PPDU (B39 of the user info field=0) and an assigned RU for the EHT STA (for example, STA3 or STA4 of FIG. 1) is within the secondary part (S160 MHz) of the FA PPDU (B39 of the user info field=1); the UL BW extension subfield of the special user info field is used together with the UL BW subfield in the common info field to indicate that a bandwidth of a solicited TB PPDU from the specified EHT STA is 160 MHz. A bandwidth of a Tx mask for the EHT STA is also 160 MHz, which follows the UL BW Extension of the special user info field.

Configuration 2

Figure 3:
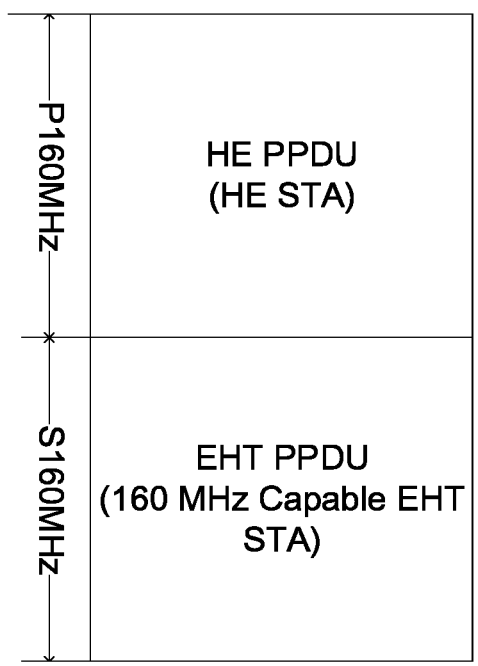
FIG. 3 shows a schematic diagram of a second configuration of FA PPDU according to embodiments of the disclosure.

FIG. 3 shows a schematic diagram of a second configuration of FA PPDU according to embodiments of the disclosure. As shown, in the second configuration, an FA PPDU may include a HE PPDU to be transmitted from a HE STA in the P160 MHz and an EHT PPDU to be transmitted from a 160 MHz capable EHT STA in the S160 MHz. That is to say, the FA PPDU will be aggregated by a composite TB HE PPDU to be transmitted from the HE STA and a composite TB EHT PPDU to be transmitted from the 160 MHz capable EHT STA, and both the composite TB HE PPDU and the composite TB EHT PPDU have a bandwidth of 160 MHz.

In order to indicate the second configuration, the above-mentioned key parameters in the trigger frame may be set as shown in Table 2 below.

TABLE 2 key parameters in the trigger frame to indicate configuration 2

| B54 of common info field | B56 of common info field | UL BW of common info field | AID of user info field | B39 of user info field | UL BW Extension of special user info field |
|---|---|---|---|---|---|
| 1 | 0 | 160 MHz | A station identity of the HE STA | 0 | — |
| | | | A station identity of the 160 MHz capable EHT STA | 1 | 160 MHz |

As shown by Table 2, B54 of the common info field, which has a value of 1, indicates that a composite PPDU to be transmitted in the primary part (P160 MHz) of the FA PPDU is a HE PPDU; B56 of the common info field, which has a value of 0, indicates that a composite PPDU to be transmitted in the secondary part (S160 MHz) of the FA PPDU is an EHT PPDU; UL BW of the common info field indicate a bandwidth of the primary part (P160 MHz) of the FA PPDU is 160 MHz; the user info field indicates that an assigned RU for the HE STA (for example, STA1 or STA2 of FIG. 1) is within the primary part (P160 MHz) of the FA PPDU (B39 of the user info field=0) and an assigned RU for the 160 MHz capable EHT STA (for example, STA3 or STA4 of FIG. 1) is secondary part (S160 MHz) of the FA PPDU (B39 of the user info field=1); the UL BW extension subfield of the special user info field is used together with the UL BW subfield in the common info field to indicate that a bandwidth of a solicited TB PPDU from the specified 160 MHz capable EHT STA is 160 MHz. A bandwidth of a Tx mask for the 160 MHz capable EHT STA is also 160 MHz, which follows the UL BW Extension of the special user info field.

Configuration 3

Figure 4:
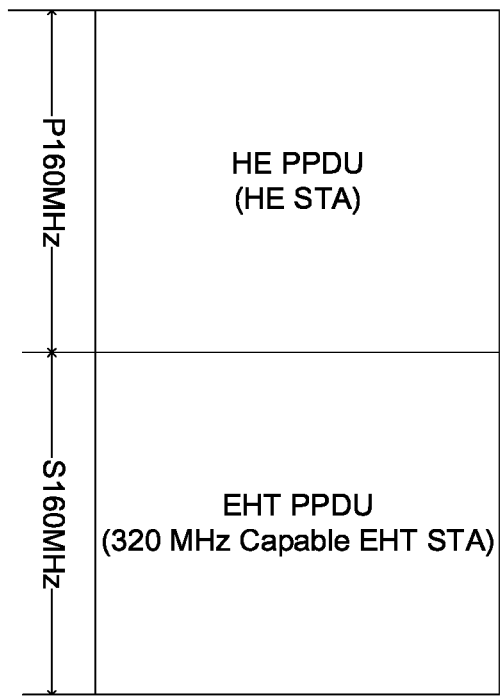
FIG. 4 shows a schematic diagram of a third configuration of FA PPDU according to embodiments of the disclosure.

FIG. 4 shows a schematic diagram of a third configuration of FA PPDU according to embodiments of the disclosure. As shown, in the third configuration, an FA PPDU may include a HE PPDU to be transmitted from a HE STA in the P160 MHz and an EHT PPDU to be transmitted from a 320 MHz capable EHT STA in the S160 MHz. That is to say, the FA PPDU will be aggregated by a composite TB HE PPDU to be transmitted from the HE STA and a composite TB EHT PPDU to be transmitted from the 320 MHz capable EHT STA. In this case, the composite TB HE PPDU has a bandwidth of 160 MHz. The composite TB EHT PPDU may have a bandwidth of 320 MHz with a half of the 320 MHz being empty, i.e., no energy will be transmitted on the half. Thus, the TB EHT PPDU can be transmitted in the S160 MHz having a bandwidth of 160 MHz.

In order to indicate the third configuration, the above-mentioned key parameters in the trigger frame may be set as shown in Table 3 below.

TABLE 3 key parameters in the trigger frame to indicate configuration 3

| B54 of common info field | B56 of common info field | UL BW of common info field | AID of user info field | B39 of user info field | UL BW Extension of special user info field |
|---|---|---|---|---|---|
| 1 | 0 | 160 MHz | A station identity of the HE STA | 0 | — |
| | | | A station identity of the 320 MHz capable EHT STA | 1 | 320 MHz |

As shown by Table 3, B54 of the common info field, which has a value of 1, indicates that a composite PPDU to be transmitted in the primary part (P160 MHz) of the FA PPDU is a HE PPDU; B56 of the common info field, which has a value of 0, indicates that a composite PPDU to be transmitted in the secondary part (S160 MHz) of the FA PPDU is an EHT PPDU; UL BW of the common info field indicate a bandwidth of the primary part (P160 MHz) of the FA PPDU is 160 MHz; the user info field indicates that an assigned RU for the HE STA (for example, STA1 or STA2 of FIG. 1) is within the primary part (P160 MHz) of the FA PPDU (B39 of the user info field=0) and an assigned RU for the 320 MHz capable EHT STA (for example, STA3 or STA4 of FIG. 1) is secondary part (S160 MHz) of the FA PPDU (B39 of the user info field=1); the UL BW extension subfield of the special user info field is used together with the UL BW subfield in the common info field to indicate that a bandwidth of a solicited TB PPDU from the specified 320 MHz capable EHT STA is 320 MHz. A bandwidth of a Tx mask for the 320 MHz capable EHT STA is also 320 MHz, which follows the UL BW Extension of the special user info field.

Configuration 4

Figure 5:
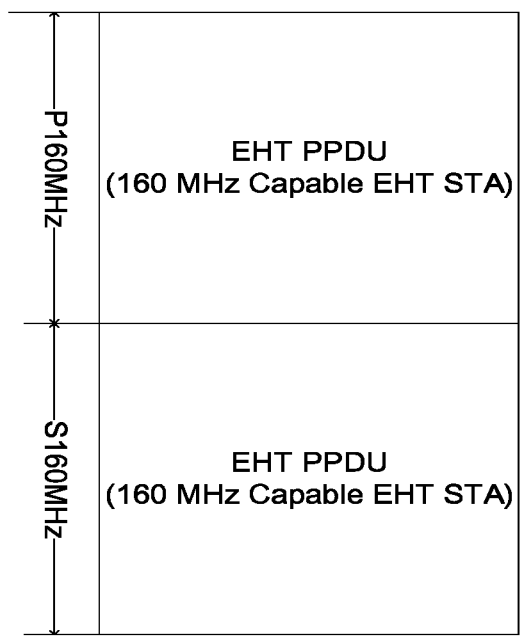
FIG. 5 shows a schematic diagram of a fourth configuration of FA PPDU according to embodiments of the disclosure.

FIG. 5 shows a schematic diagram of a fourth configuration of FA PPDU according to embodiments of the disclosure. As shown, in the fourth configuration, an FA PPDU may include an EHT PPDU to be transmitted from a 160 MHz capable EHT STA in the P160 MHz and another EHT PPDU to be transmitted from another 160 MHz capable EHT STA in the S160 MHz. That is to say, the FA PPDU will be aggregated by a composite TB EHT PPDU to be transmitted from the 160 MHz capable EHT STA and another composite TB EHT PPDU to be transmitted from the other 160 MHz capable EHT STA. In this case, both the composite TB EHT PPDU have a bandwidth of 160 MHz.

In order to indicate the fourth configuration, the above-mentioned key parameters in the trigger frame may be set as shown in Table 4 below.

TABLE 4 key parameters in the trigger frame to indicate configuration 4

| B54 of common info field | B56 of common info field | UL BW of common info field | AID of user info field | B39 of user info field | UL BW Extension of special user info field |
|---|---|---|---|---|---|
| 0 | 0 | 160 MHz | A station identity of the 160 MHz capable | 0 | 160 MHz |

TABLE 4-continued key parameters in the trigger frame to indicate configuration 4

| B54 of common info field | B56 of common info field | UL BW of common info field | AID of user info field | B39 of user info field | UL BW Extension of special user info field |
|---|---|---|---|---|---|
| | | | EHT STA A station identity of the other 160 MHz capable EHT STA | 1 | 160 MHz |

As shown by Table 4, B54 of the common info field, which has a value of 0, indicates that a composite PPDU to be transmitted in the primary part (P160 MHz) of the FA PPDU is an EHT PPDU; B56 of the common info field, which has a value of 0, indicates that a composite PPDU to be transmitted in the secondary part (S160 MHz) of the FA PPDU is also an EHT PPDU; UL BW of the common info field indicate a bandwidth of the primary part (P160 MHz) of the FA PPDU is 160 MHz; the user info field indicates that an assigned RU for the 160 MHz capable EHT STA (for example, STA3 or STA4 of FIG. 1) is within the primary part (P160 MHz) of the FA PPDU (B39 of the user info field=0) and an assigned RU for the other 160 MHz capable EHT STA (for example, STA3 or STA4 of FIG. 1) is within the secondary part (S160 MHz) of the FA PPDU (B39 of the user info field=1); the UL BW extension subfield of the special user info field is used together with the UL BW subfield in the common info field to indicate that a bandwidth of a solicited TB PPDU from each specified 160 MHz capable EHT STA is 160 MHz. A bandwidth of a Tx mask for each 160 MHz capable EHT STA is also 160 MHz, which follows the UL BW Extension of the special user info field.

Configuration 5

Figure 6:
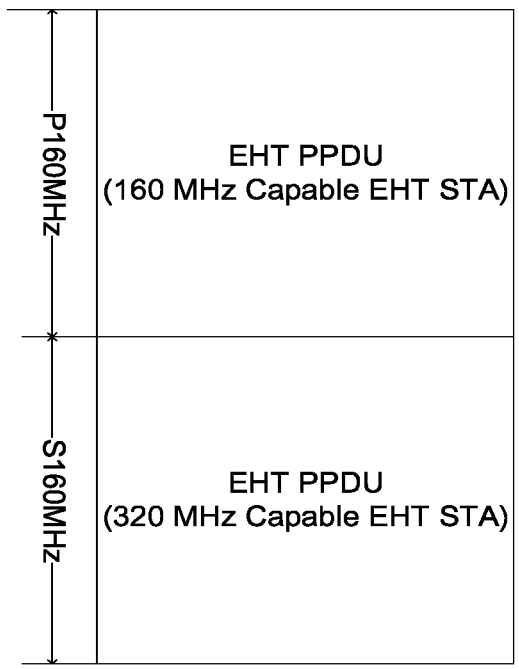
FIG. 6 shows a schematic diagram of a fifth configuration of FA PPDU according to embodiments of the disclosure.

FIG. 6 shows a schematic diagram of a fifth configuration of FA PPDU according to embodiments of the disclosure. As shown, in the fifth configuration, an FA PPDU may include an EHT PPDU to be transmitted from a 160 MHz capable EHT STA in the P160 MHz and another EHT PPDU to be transmitted from a 320 MHz capable EHT STA in the S160 MHz. That is to say, the FA PPDU will be aggregated by a composite TB EHT PPDU to be transmitted from the 160 MHz capable EHT STA and another composite TB EHT PPDU to be transmitted from the 320 MHz capable EHT STA. In this case, the composite TB EHT PPDU to be transmitted from the 160 MHz capable EHT STA has a bandwidth of 160 MHz. The composite TB EHT PPDU to be transmitted from the 320 MHz capable EHT STA may have a bandwidth of 320 MHz with a half of the 320 MHz being empty, i.e., no energy will be transmitted on the half. Thus, the 320 MHz TB EHT PPDU can be transmitted in the S160 MHz having a bandwidth of 160 MHz.

In order to indicate the fourth configuration, the above-mentioned key parameters in the trigger frame may be set as shown in Table 5 below.

TABLE 5 key parameters in the trigger frame to indicate configuration 5

| B54 of common info field | B56 of common info field | UL BW of common info field | AID of user info field | B39 of user info field | UL BW Extension of special user info field |
|---|---|---|---|---|---|
| 0 | 0 | 160 MHz | A station identity of the 160 MHz capable EHT STA | 0 | 160 MHz |
| | | | A station identity of the 320 MHz capable EHT STA | 1 | 320 MHz |

As shown by Table 5, B54 of the common info field, which has a value of 0, indicates that a composite PPDU to be transmitted in the primary part (P160 MHz) of the FA PPDU is an EHT PPDU; B56 of the common info field, which has a value of 0, indicates that a composite PPDU to be transmitted in the secondary part (S160 MHz) of the FA PPDU is also an EHT PPDU; UL BW of the common info field indicate a bandwidth of the primary part (P160 MHz) of the FA PPDU is 160 MHz; the user info field indicates that an assigned RU for the 160 MHz capable EHT STA (for example, STA3 or STA4 of FIG. 1) is within the primary part (P160 MHz) of the FA PPDU (B39 of the user info field=0) and an assigned RU for the 320 MHz capable EHT STA (for example, STA3 or STA4 of FIG. 1) is within the secondary part (S160 MHz) of the FA PPDU (B39 of the user info field=1); the UL BW extension subfield of the special user info field for the 160 MHz capable EHT STA is used together with the UL BW subfield in the common info field to indicate that a bandwidth of a solicited TB PPDU from the specified 160 MHz capable EHT STA is 160 MHz; and the UL BW extension subfield of the special user info field for the 320 MHz capable EHT STA is used together with the UL BW subfield in the common info field to indicate that a bandwidth of a solicited TB PPDU from the specified 320 MHz capable EHT STA is 320 MHz. A bandwidth of a Tx mask for the 160 MHz capable EHT STA is also 160 MHz, which follows the UL BW Extension of the special user info field for the 160 MHz capable EHT STA. A bandwidth of a Tx mask for the 320 MHz capable EHT STA is also 320 MHz, which follows the UL BW Extension of the special user info field for the 320 MHz capable EHT STA.

It is to be noted that when only configurations 2 to 5 are considered, B56 of the common info field may not be required, since for these configurations a composite PPDU to be transmitted in the secondary part (S160 MHz) of the FA PPDU is always an EHT PPDU.

These configurations are described for illustrative purpose only, which should not be used to limit the scope of the disclosure. Other appropriate configurations conformed to the substantive principle of the disclosure may also be included. As a non-restrictive example, the primary part and the secondary part of the FA PPDU may be further divided to permit simultaneous transmission of more STAs.

Returning to FIG. 1, each of the STAs 120 receives the trigger frame transmitted by the AP 110 and determines whether it is one of the specified STAs, for example, by checking whether its AID is indicated by the trigger frame for the configuration FA PPDU. If the STA is not one of the specified STAs, it may ignore the trigger frame. If the STA is one of the specified STAs, it may parse the signaling for the configuration of FA PPDU together with RU allocation signaling in a user info field matching the AID of the STA. The STA may then encode a composite TB PPDU in response to the trigger frame and as required by the configuration of FA PPDU. The composite TB PPDU may be aggregated with other composite TB PPDU(s) from other specified STA(s). For example, the AP 110 may specify where to perform the aggregation.

Figure 7:
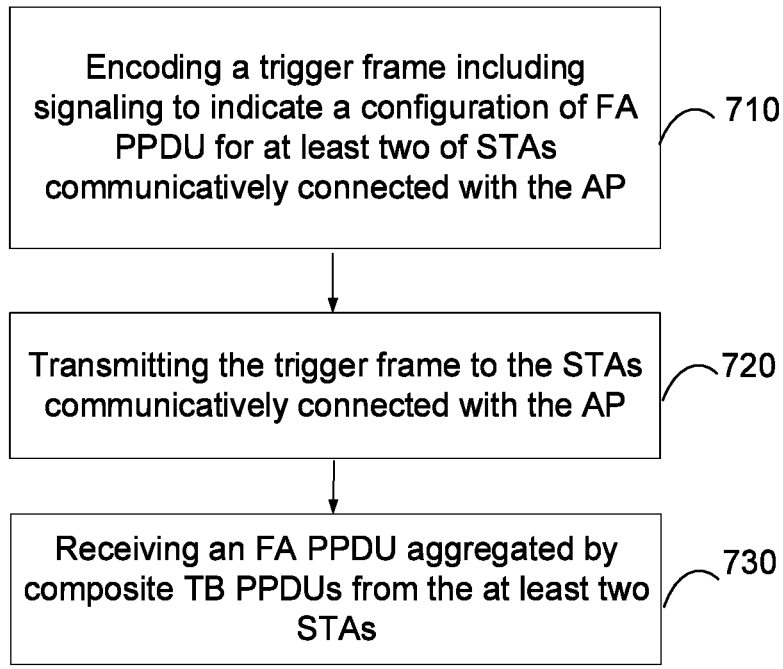
FIG. 7 is a flowchart showing a process performed by an AP to configure an FA PPDU for TB PPDUs, according to embodiments of the disclosure.

FIG. 7 is a flowchart showing a process 700 performed by an AP to configure an FA PPDU for TB PPDUs, according to embodiments of the disclosure. The process 700 may be implemented, for example, in the Wi-Fi network 100 described herein with reference to FIG. 1. The AP may be the AP 110 of FIG. 1.

The process 700 may include, at 710, encoding a trigger frame including signaling to indicate a configuration of FA PPDU for at least two of STAs communicatively connected with the AP. The process 700 may include, at 720, transmitting the trigger frame to the STAs communicatively connected with the AP. The process 700 may further include, at 730, receiving an FA PPDU aggregated by composite TB PPDUs from the at least two STAs.

Figure 8:
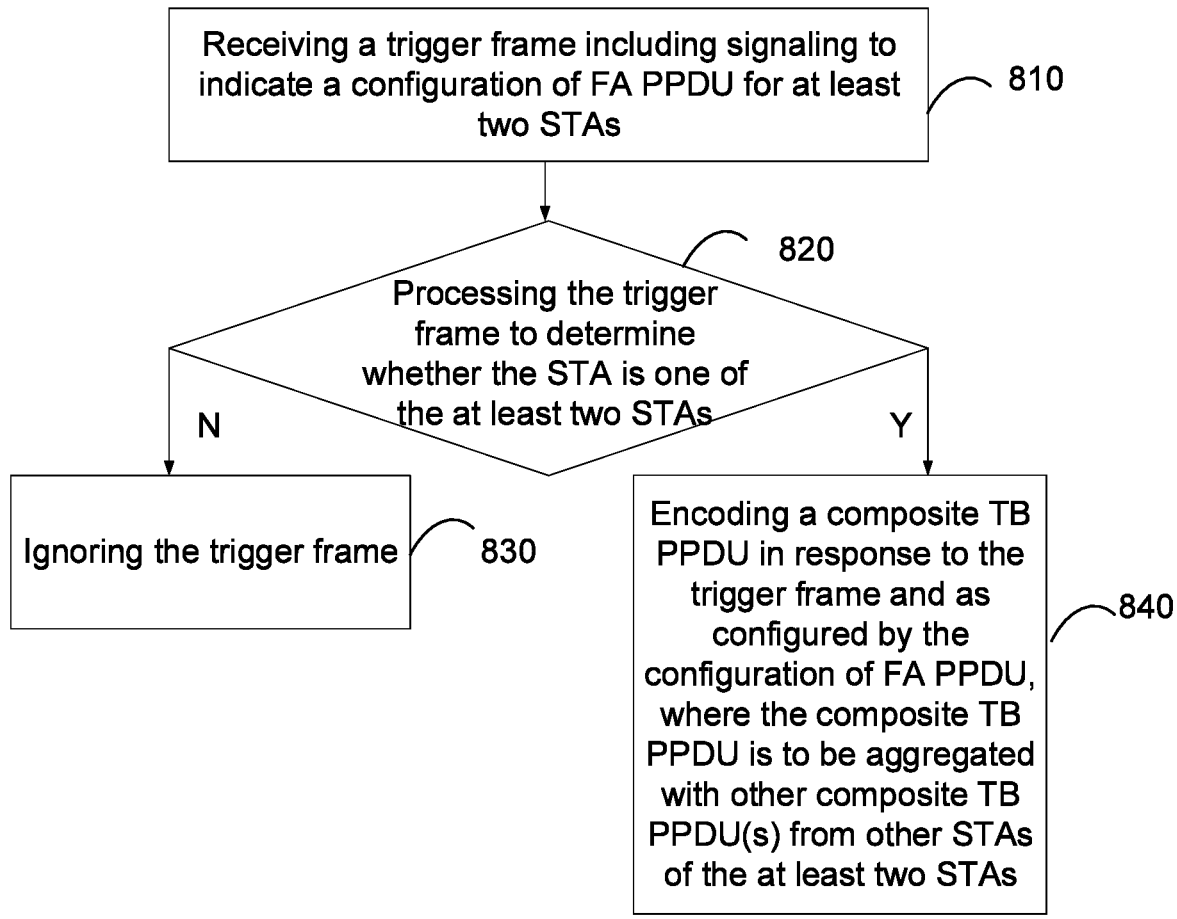
FIG. 8 is a flowchart showing a process performed by a STA in a Wi-Fi network where frequency aggregation is enabled for TB PPDUs, according to embodiments of the disclosure.

FIG. 8 is a flowchart showing a process 800 performed by a STA in a Wi-Fi network where frequency aggregation is enabled for TB PPDUs, according to embodiments of the disclosure. The process 800 may be implemented, for example, in the Wi-Fi network 100 described herein with reference to FIG. 1. The STA may be one of the STAs 120 of FIG. 1.

The process 800 may include, at 810, receiving a trigger frame including signaling to indicate a configuration of FA PPDU for at least two STAs. The process 800 may include, at 820, processing the trigger frame to determine whether the STA is one of the at least two STAs. For example, the processing of the trigger frame may include unpacking, demodulating or decoding according to actual requirements, which is not limited herein.

If the STA is not one of the at least two STAs, the process 800 may proceed to 830 to ignore the trigger frame. If the STA is one of the at least two STAs, the process 800 may proceed to 840 to encode a composite TB PPDU in response to the trigger frame and as configured by the configuration of FA PPDU, where the composite TB PPDU is to be aggregated with other composite TB PPDU(s) from other STAs of the at least two STAs.

More particularly, the process 700 of FIG. 7 or the process 800 of FIG. 8 may be implemented in one or more modules as a set of logic instructions stored in a machine—or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the process 700 of FIG. 7 or the process 800 of FIG. 8 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 9:
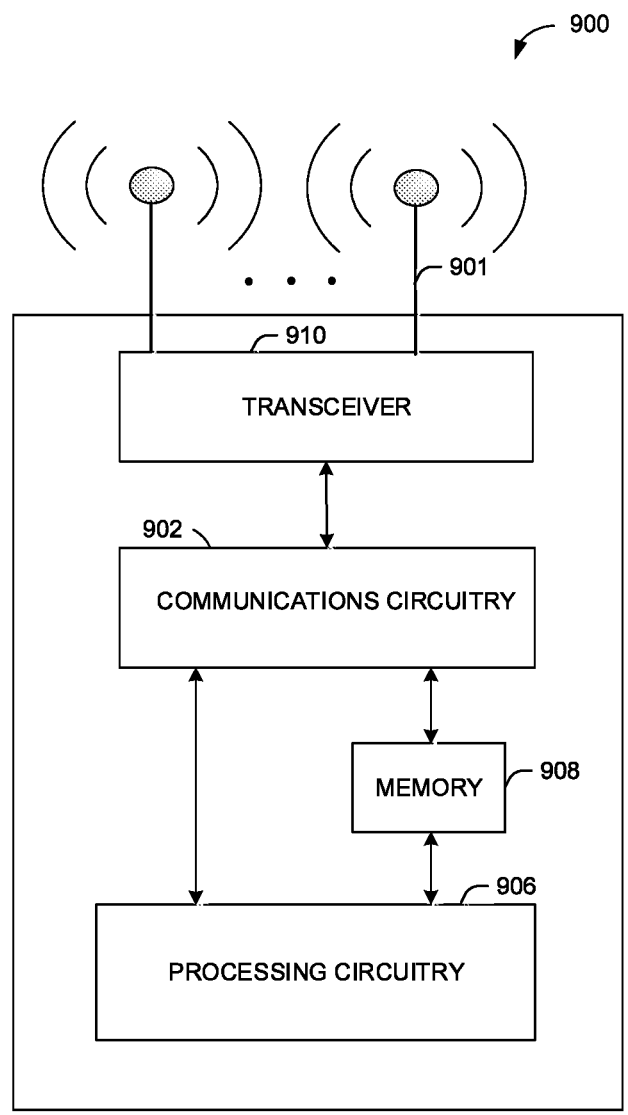
FIG. 9 shows a functional diagram of an exemplary communication device, according to embodiments of the disclosure.

FIG. 9 shows a functional diagram of an exemplary communication device 900, in accordance with embodiments of the disclosure. In one embodiment, FIG. 9 illustrates a functional block diagram of a communication device that may be suitable for use as any of the AP 110 (FIG. 1) or the STAs 120 (FIG. 1) in accordance with some embodiments. The communication device 900 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication device 900 may include communications circuitry 902 and a transceiver 910 for transmitting and receiving signals to and from other communication devices using one or more radio frequency (RF) antennas 901. The communications circuitry 902 may include circuitry that can operate the physical layer (PHY) communications and/or medium access control (MAC) communications for controlling access to the wireless medium, and/or any other communications layers for transmitting and receiving signals. The communication device 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc.

The processing circuitry 906 may be coupled to the communications circuitry 902 or transceiver 910 by a radio frequency (RF) interface (not shown) to transmit or receive data to and from other communication devices using the RF antennas 901. In some embodiments, the processing circuitry 906 of the communication device 900 may include one or more processors. In other embodiments, two or more RF antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 900 may include one or more RF antennas 901. The RF antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 900 may include one or more of a keyboard, a display, a non-volatile memory port, multiple antennas, a graphics processor, an application processor, speakers, and other mobile device elements. The display may be an LCD screen including a touch screen.

Although the communication device 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 900 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication device 900 may include one or more processors and may be configured with instructions stored on a computer-readable storage device.

Figure 10:
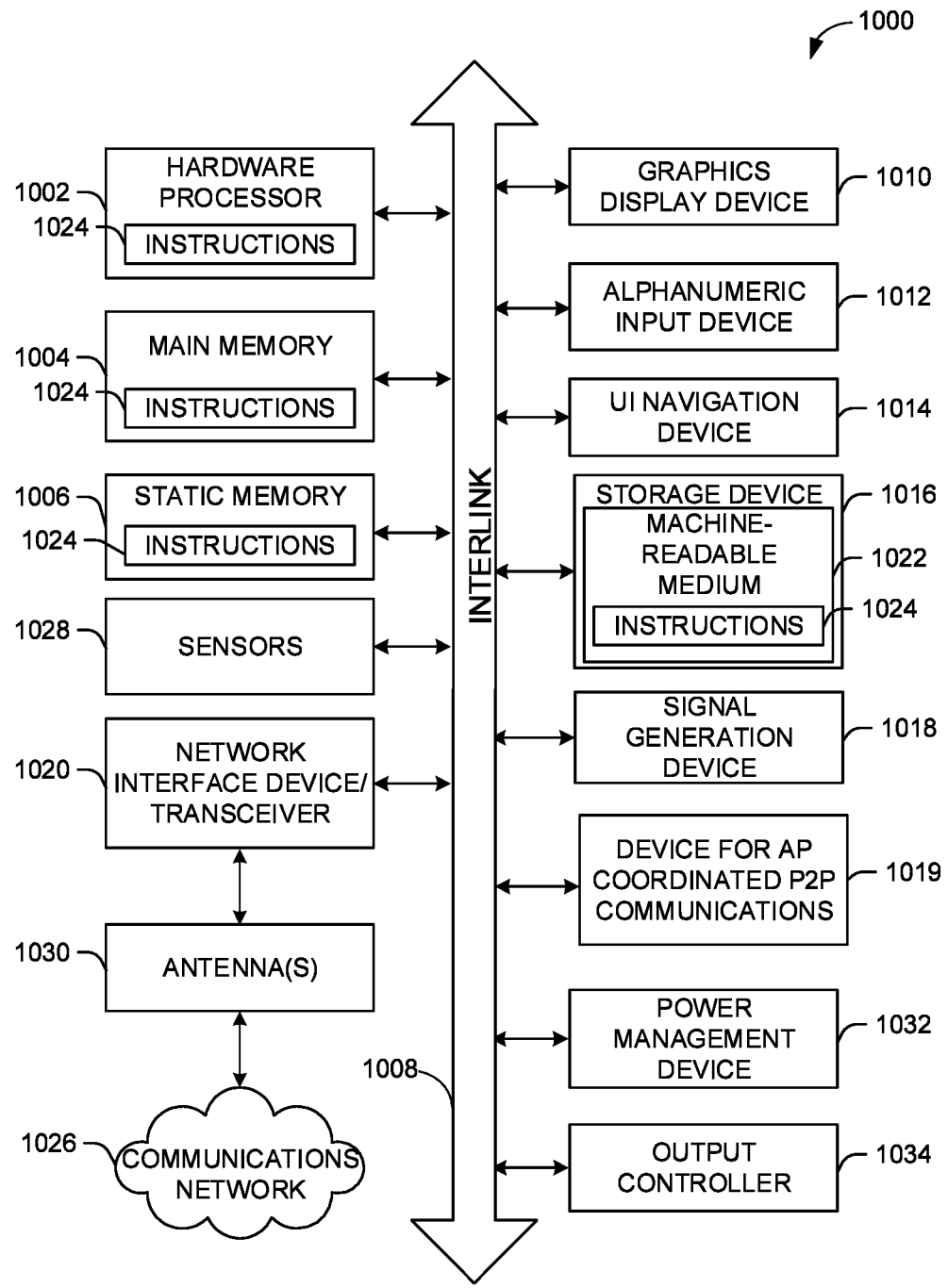
FIG. 10 shows a block diagram of an example of a machine or system upon which any one or more of the techniques discussed herein may be performed.

FIG. 10 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (e.g., drive unit) 1016, a signal generation device 1018 (e.g., a speaker), a device for AP coordinated P2P communications 1019, a network interface device/transceiver 1020 coupled to antenna(s) 1030, and one or more sensors 1028, such as a global positioning system (GPS) sensor, a compass, an accelerometer, or other sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1002 for generation and processing of the baseband signals and for controlling operations of the main memory 1004, the storage device 1016, and/or the device for AP coordinated P2P communications 1019. The baseband processor may be provided on a single radio card, a single chip, or an integrated circuit (IC).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

The device for AP coordinated P2P communications 1019 may carry out or perform any of the operations and processes (e.g., processes 700, 800 and 900) described and shown above.

It is understood that the above are only a subset of what the signaling operation info and device for AP coordinated P2P communications 1019 may be configured to perform and that other functions included throughout this disclosure may also be performed by the device for AP coordinated P2P communications 1019.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-FIR, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 11:
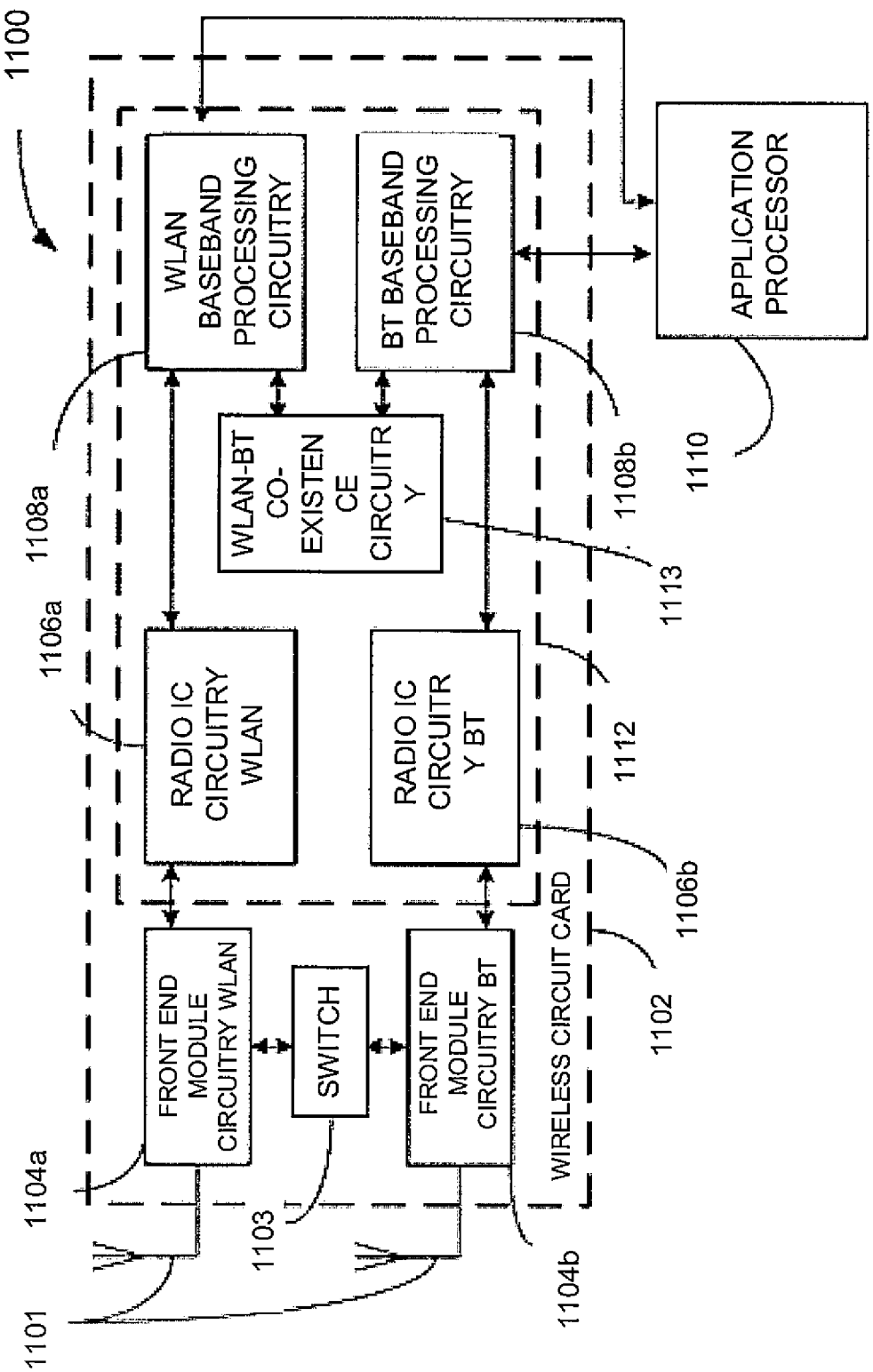
FIG. 11 is a block diagram of a radio architecture, according to embodiments of the disclosure.

FIG. 11 is a block diagram of a radio architecture 1100 in accordance with some embodiments that may be implemented in any Wi-Fi device described above. Radio architecture 1100 may include radio front-end module (FEM) circuitry 1104a-b, radio IC circuitry 1106a-b and baseband processing circuitry 1108a-b. Radio architecture 1100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1104a-b may include a WLAN or Wi-Fi FEM circuitry 1104a and a Bluetooth (BT) FEM circuitry 1104b. The WLAN FEM circuitry 1104a may include a receive signal path comprising circuitry configured to operate on WLAN RF signals received from one or more antennas 1101, to amplify the received signals and to provide the amplified versions of the received signals to the WLAN radio IC circuitry 1106a for further processing. The BT FEM circuitry 1104b may include a receive signal path which may include circuitry configured to operate on BT RF signals received from one or more antennas 1101, to amplify the received signals and to provide the amplified versions of the received signals to the BT radio IC circuitry 1106b for further processing. FEM circuitry 1104a may also include a transmit signal path which may include circuitry configured to amplify WLAN signals provided by the radio IC circuitry 1106a for wireless transmission by one or more of the antennas 1101. In addition, FEM circuitry 1104b may also include a transmit signal path which may include circuitry configured to amplify BT signals provided by the radio IC circuitry 1106*b* for wireless transmission by the one or more antennas. In the embodiment of FIG. 11, although FEM 1104*a* and FEM 1104*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1106*a-b* as shown may include WLAN radio IC circuitry 1106*a* and BT radio IC circuitry 1106*b*. The WLAN radio IC circuitry 1106*a* may include a receive signal path which may include circuitry to down-convert WLAN RF signals received from the FEM circuitry 1104*a* and provide baseband signals to WLAN baseband processing circuitry 1108*a*. BT radio IC circuitry 1106*b* may in turn include a receive signal path which may include circuitry to down-convert BT RF signals received from the FEM circuitry 1104*b* and provide baseband signals to BT baseband processing circuitry 1108*b*. WLAN radio IC circuitry 1106*a* may also include a transmit signal path which may include circuitry to up-convert WLAN baseband signals provided by the WLAN baseband processing circuitry 1108*a* and provide WLAN RF output signals to the FEM circuitry 1104*a* for subsequent wireless transmission by the one or more antennas 1101. BT radio IC circuitry 1106*b* may also include a transmit signal path which may include circuitry to up-convert BT baseband signals provided by the BT baseband processing circuitry 1108*b* and provide BT RF output signals to the FEM circuitry 1104*b* for subsequent wireless transmission by the one or more antennas 1101. In the embodiment of FIG. 11, although radio IC circuitries 1106*a* and 1106*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1108*a-b* may include a WLAN baseband processing circuitry 1108*a* and a BT baseband processing circuitry 1108*b*. The WLAN baseband processing circuitry 1108*a* may include a memory, such as, for example, a set of RAM arrays in a Fast Fourier Transform or Inverse Fast Fourier Transform block (not shown) of the WLAN baseband processing circuitry 1108*a*. Each of the WLAN baseband circuitry 1108*a* and the BT baseband circuitry 1108*b* may further include one or more processors and control logic to process the signals received from the corresponding WLAN or BT receive signal path of the radio IC circuitry 1106*a-b*, and to also generate corresponding WLAN or BT baseband signals for the transmit signal path of the radio IC circuitry 1106*a-b*. Each of the baseband processing circuitries 1108*a* and 1108*b* may further include physical layer (PHY) and medium access control layer (MAC) circuitry, and may further interface with a device for generation and processing of the baseband signals and for controlling operations of the radio IC circuitry 1106*a-b*.

Referring still to FIG. 11, according to the shown embodiment, WLAN-BT coexistence circuitry 1113 may include logic providing an interface between the WLAN baseband circuitry 1108*a* and the BT baseband circuitry 1108*b* to enable use cases requiring WLAN and BT coexistence. In addition, a switch 1103 may be provided between the WLAN FEM circuitry 1104*a* and the BT FEM circuitry 1104*b* to allow switching between the WLAN and BT radios according to application needs. In addition, although the antennas 1101 are depicted as being respectively connected to the WLAN FEM circuitry 1104*a* and the BT FEM circuitry 1104*b*, embodiments include within their scope the sharing of one or more antennas as between the WLAN and BT FEMs, or the provision of more than one antenna connected to each of FEM 1104*a* or 1104*b*.

In some embodiments, the front-end module circuitry 1104*a-b*, the radio IC circuitry 1106*a-b*, and baseband processing circuitry 1108*a-b* may be provided on a single radio card, such as wireless radio card 1102. In some other embodiments, the one or more antennas 1101, the FEM circuitry 1104*a-b* and the radio IC circuitry 1106*a-b* may be provided on a single radio card. In some other embodiments, the radio IC circuitry 1106*a-b* and the baseband processing circuitry 1108*a-b* may be provided on a single chip or integrated circuit (IC), such as IC 1112.

In some embodiments, the wireless radio card 1102 may include a WLAN radio card and may be configured for Wi-Fi communications, although the scope of the embodiments is not limited in this respect. In some of these embodiments, the radio architecture 1100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1100 may be part of a Wi-Fi communication device, such as a wireless access point (AP), a base station or a mobile device. In some of these embodiments, radio architecture 1100 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay, 802.11ax and/or 802.11be standards and/or proposed specifications for WLANs, although the scope of embodiments is not limited in this respect. Radio architecture 1100 may also be suitable to transmit and/or receive communications in accordance with other techniques and standards.

In some embodiments, the radio architecture 1100 may be configured for high-efficiency Wi-Fi (HEW) communications in accordance with the IEEE 802.11ax standard or extremely high throughput Wi-Fi (Wi-Fi EHT) communications in accordance with the IEEE 802.11be standard. In these embodiments, the radio architecture 1100 may be configured to communicate in accordance with an OFDMA technique, although the scope of the embodiments is not limited in this respect.

In some other embodiments, the radio architecture 1100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 11, the BT baseband circuitry 1108*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 1100 may include other radio cards, such as a cellular radio card configured for cellular (e.g., 3GPP such as LTE, LTE-Advanced or 5G communications).

In some IEEE 802.11 embodiments, the radio architecture 1100 may be configured for communication over various channel bandwidths including bandwidths having center frequencies of about 900 MHZ, 2.4 GHZ, 5 GHZ, and bandwidths of about 2 MHZ, 4 MHZ, 5 MHZ, 5.5 MHZ, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 12:
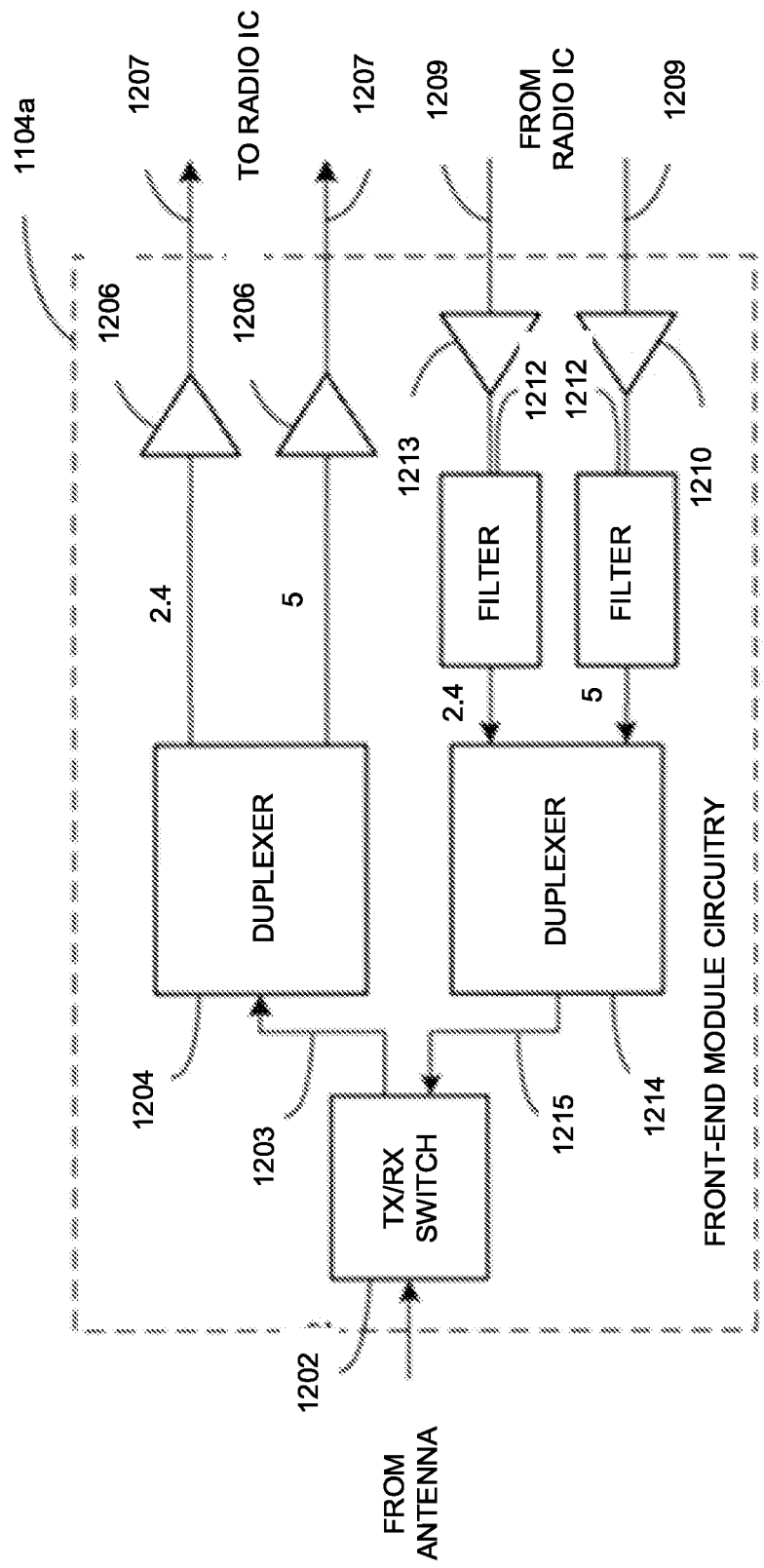
FIG. 12 is a functional block diagram illustrating the WLAN FEM circuitry of FIG. 11.

FIG. 12 illustrates WLAN FEM circuitry 1104a in accordance with some embodiments. Although the example of FIG. 12 is described in conjunction with the WLAN FEM circuitry 1104a, the example of FIG. 12 may be described in conjunction with the example BT FEM circuitry 1104b (FIG. 11), although other circuitry configurations may also be suitable.

In some embodiments, the FEM circuitry 1104a may include a TX/RX switch 1202 to switch between transmit mode and receive mode operation. The FEM circuitry 1104a may include a receive signal path and a transmit signal path. The receive signal path of the FEM circuitry 1104a may include a low-noise amplifier (LNA) 1206 to amplify received RF signals 1203 and provide the amplified received RF signals 1207 as an output (e.g., to the radio IC circuitry 1106a-b (FIG. 11)). The transmit signal path of the circuitry 1104a may include a power amplifier (PA) to amplify input RF signals 1209 (e.g., provided by the radio IC circuitry 1106a-b), and one or more filters 1212, such as band-pass filters (BPFs), low-pass filters (LPFs) or other types of filters, to generate RF signals 1215 for subsequent transmission (e.g., by one or more of the antennas 1101 (FIG. 11)) via an example duplexer 1214.

In some dual-mode embodiments for Wi-Fi communication, the FEM circuitry 1104a may be configured to operate in either the 2.4 GHz frequency spectrum or the 5 GHz frequency spectrum. In these embodiments, the receive signal path of the FEM circuitry 1104a may include a receive signal path duplexer 1204 to separate the signals from each spectrum as well as provide a separate LNA 1206 for each spectrum as shown. In these embodiments, the transmit signal path of the FEM circuitry 1104a may also include a power amplifier 1210 and a filter 1212, such as a BPF, an LPF or another type of filter for each frequency spectrum and a transmit signal path duplexer 1204 to provide the signals of one of the different spectrums onto a single transmit path for subsequent transmission by the one or more of the antennas 1101 (FIG. 11). In some embodiments, BT communications may utilize the 2.4 GHz signal paths and may utilize the same FEM circuitry 1104a as the one used for WLAN communications.

Figure 13:
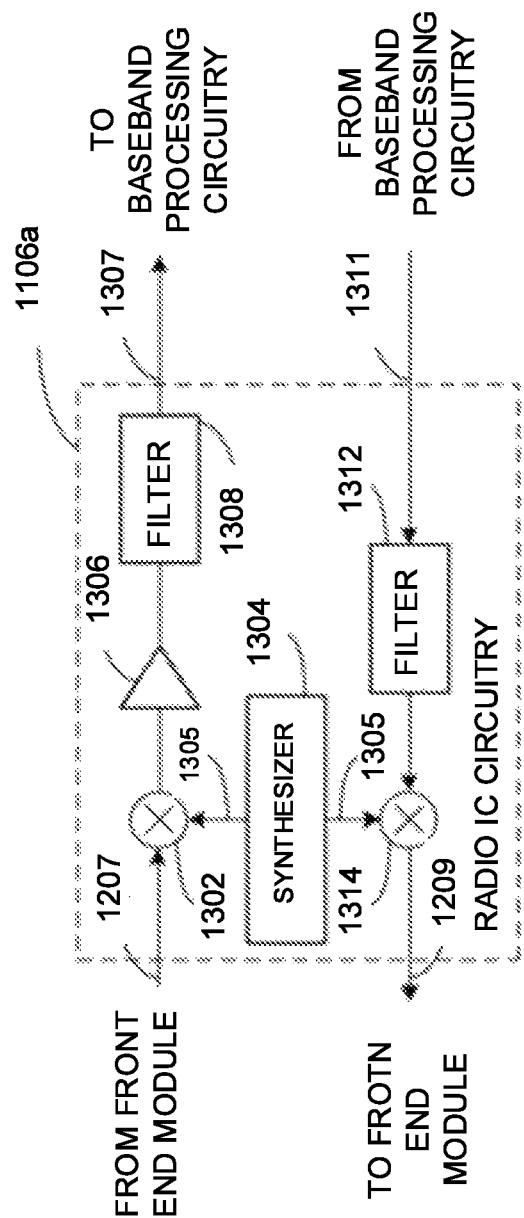
FIG. 13 is a functional block diagram illustrating the radio IC circuitry of FIG. 11.

FIG. 13 illustrates radio IC circuitry 1106a in accordance with some embodiments. The radio IC circuitry 1106a is one example of circuitry that may be suitable for use as the WLAN or BT radio IC circuitry 1106a/1106b (FIG. 11), although other circuitry configurations may also be suitable. Alternatively, the example of FIG. 13 may be described in conjunction with the example BT radio IC circuitry 1106b.

In some embodiments, the radio IC circuitry 1106a may include a receive signal path and a transmit signal path. The receive signal path of the radio IC circuitry 1106a may include at least mixer circuitry 1302, such as, for example, down-conversion mixer circuitry, amplifier circuitry 1306 and filter circuitry 1308. The transmit signal path of the radio IC circuitry 1106a may include at least filter circuitry 1312 and mixer circuitry 1314, such as, for example, up-conversion mixer circuitry. Radio IC circuitry 1106a may also include synthesizer circuitry 1304 for synthesizing a frequency 1305 for use by the mixer circuitry 1302 and the mixer circuitry 1314. The mixer circuitry 1302 and/or 1314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 13 illustrates only a simplified version of a radio IC circuitry, and may include, although not shown, embodiments where each of the depicted circuitries may include more than one component. For instance, mixer circuitry 1314 may each include one or more mixers, and filter circuitries 1308 and/or 1312 may each include one or more filters, such as one or more BPFs and/or LPFs according to application needs. For example, when mixer circuitries are of the direct-conversion type, they may each include two or more mixers.

In some embodiments, mixer circuitry 1302 may be configured to down-convert RF signals 1207 received from the FEM circuitry 1104a-b (FIG. 11) based on the synthesized frequency 1305 provided by synthesizer circuitry 1304. The amplifier circuitry 1306 may be configured to amplify the down-converted signals and the filter circuitry 1308 may include an LPF configured to remove unwanted signals from the down-converted signals to generate output baseband signals 1307. Output baseband signals 1307 may be provided to the baseband processing circuitry 1108a-b (FIG. 11) for further processing. In some embodiments, the output baseband signals 1307 may be zero-frequency baseband signals, although this is not a requirement. In some embodiments, mixer circuitry 1302 may comprise passive mixers, although the scope of the embodiments is not limited in this respect.

In some embodiments, the mixer circuitry 1314 may be configured to up-convert input baseband signals 1311 based on the synthesized frequency 1305 provided by the synthesizer circuitry 1304 to generate RF output signals 1209 for the FEM circuitry 1104a-b. The baseband signals 1311 may be provided by the baseband processing circuitry 1108a-b and may be filtered by filter circuitry 1312. The filter circuitry 1312 may include an LPF or a BPF, although the scope of the embodiments is not limited in this respect.

In some embodiments, the mixer circuitry 1302 and the mixer circuitry 1314 may each include two or more mixers and may be arranged for quadrature down-conversion and/or up-conversion respectively with the help of synthesizer 1304. In some embodiments, the mixer circuitry 1302 and the mixer circuitry 1314 may each include two or more mixers each configured for image rejection (e.g., Hartley image rejection). In some embodiments, the mixer circuitry 1302 and the mixer circuitry 1314 may be arranged for direct down-conversion and/or direct up-conversion, respectively. In some embodiments, the mixer circuitry 1302 and the mixer circuitry 1314 may be configured for super-heterodyne operation, although this is not a requirement.

Mixer circuitry 1302 may comprise, according to one embodiment: quadrature passive mixers (e.g., for the in-phase (I) and quadrature phase (Q) paths). In such an embodiment, RF input signal 1307 from FIG. 13 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 1305 of synthesizer 1304 (FIG. 13). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1306 (FIG. 13) or to filter circuitry 1308 (FIG. 13).

In some embodiments, the output baseband signals 1307 and the input baseband signals 1311 may be analog baseband signals, although the scope of the embodiments is not limited in this respect. In some alternate embodiments, the output baseband signals 1307 and the input baseband signals 1311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1304 may be a fractional-N synthesizer or a fractional N/N+1 synthesizer, although the scope of the embodiments is not limited in this respect as other types of frequency synthesizers may be suitable. For example, synthesizer circuitry 1304 may be a delta-sigma synthesizer, a frequency multiplier, or a synthesizer comprising a phase-locked loop with a frequency divider. According to some embodiments, the synthesizer circuitry 1304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1304 may be provided by a voltage controlled oscillator (VCO), although that is not a requirement. A divider control input may further be provided by either the baseband processing circuitry 1108*a-b* (FIG. 11) depending on the desired output frequency 1305. In some embodiments, a divider control input (e.g., N) may be determined from a look-up table (e.g., within a Wi-Fi card) based on a channel number and a channel center frequency as determined or indicated by the example application processor 1110.

In some embodiments, synthesizer circuitry 1304 may be configured to generate a carrier frequency as the output frequency 1305, while in other embodiments, the output frequency 1305 may be a fraction of the carrier frequency (e.g., one-half the carrier frequency, one-third the carrier frequency). In some embodiments, the output frequency 1305 may be a LO frequency ($f_{LO}$).

Figure 14:
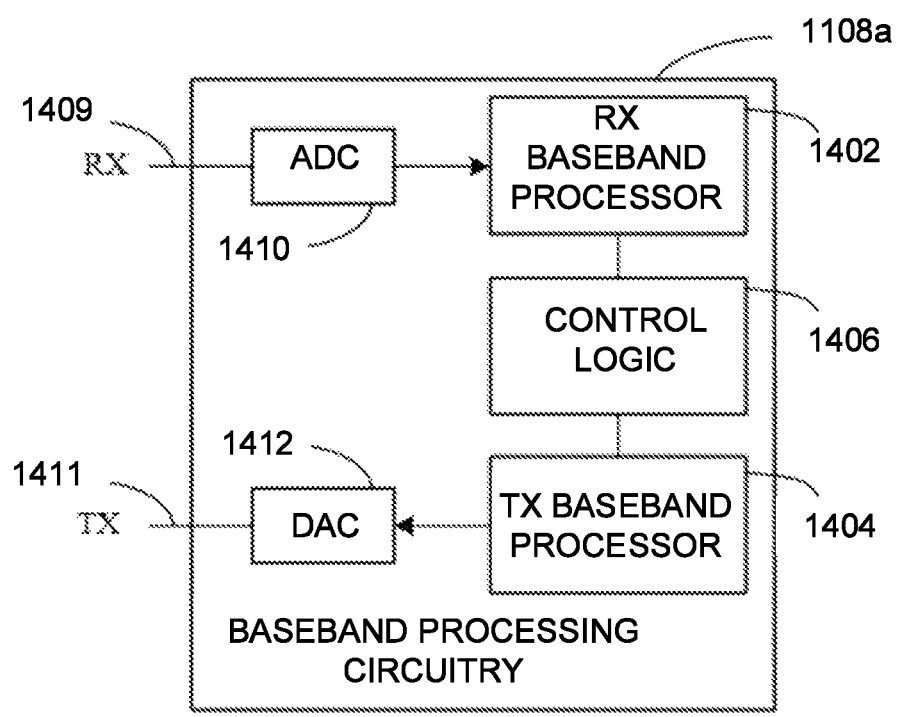
FIG. 14 is a functional block diagram illustrating the baseband processing circuitry of FIG. 11.

FIG. 14 illustrates a functional block diagram of baseband processing circuitry 1108*a* in accordance with some embodiments. The baseband processing circuitry 1108*a* is one example of circuitry that may be suitable for use as the baseband processing circuitry 1108*a* (FIG. 11), although other circuitry configurations may also be suitable. Alternatively, the example of FIG. 14 may be used to implement the example BT baseband processing circuitry 1108*b* of FIG. 11.

The baseband processing circuitry 1108*a* may include a receive baseband processor (RX BBP) 1402 for processing receive baseband signals 1409 provided by the radio IC circuitry 1106*a-b* (FIG. 11) and a transmit baseband processor (TX BBP) 1404 for generating transmit baseband signals 1411 for the radio IC circuitry 1106*a-b*. The baseband processing circuitry 1208*a* may also include control logic 1406 for coordinating the operations of the baseband processing circuitry 1108*a*.

In some embodiments (e.g., when analog baseband signals are exchanged between the baseband processing circuitry 1108*a-b* and the radio IC circuitry 1106*a-b*), the baseband processing circuitry 1108*a* may include ADC 1410 to convert analog baseband signals 1409 received from the radio IC circuitry 1106*a-b* to digital baseband signals for processing by the RX BBP 1402. In these embodiments, the baseband processing circuitry 1108*a* may also include DAC 1412 to convert digital baseband signals from the TX BBP 1404 to analog baseband signals 1411.

In some embodiments that communicate OFDM signals or OFDMA signals, such as through baseband processor 1108*a*, the transmit baseband processor 1404 may be configured to generate OFDM or OFDMA signals as appropriate for transmission by performing an inverse fast Fourier transform (IFFT). The receive baseband processor 1402 may be configured to process received OFDM signals or OFDMA signals by performing an FFT. In some embodiments, the receive baseband processor 1402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 11, in some embodiments, the antennas 1101 (FIG. 11) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1101 may each include a set of phased-array antennas, although embodiments are not so limited.

Although the radio architecture 1100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following paragraphs describe examples of various embodiments.

Example 1 includes an apparatus for an access point (AP), comprising: a radio frequency (RF) interface; and processing circuitry coupled with the RF interface and configured to: encode a trigger frame to be transmitted via the RF interface to stations (STAs) communicatively connected with the AP, wherein the trigger frame comprises signaling to indicate a configuration of frequency domain aggregated (FA) physical layer protocol data unit (PPDU) for at least two STAs; and decode an FA PPDU aggregated by composite trigger based (TB) PPDUs from the at least two STAs.

Example 2 includes the apparatus of Example 1, wherein the signaling specifies each of the at least two STAs using a station identity (AID) of the STA.

Example 3 includes the apparatus of Example 1 or 2, wherein for each of the composite TB PPDUs, one or more resource units (RUs) are allocated to one or more STAs.

Example 4 includes the apparatus of any of Examples 1-3, wherein the configuration of FA-PPDU is determined by at least one of: each solicited composite TB PPDU; a bandwidth of each solicited composite TB PPDU; and a PPDU type of each solicited composite TB PPDU.

Example 5 includes the apparatus of any of Examples 1-4, wherein: B54 of a common info field in the trigger frame is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU; B39 of a user info field in the trigger frame is set to 0 to indicate that an assigned resource unit (RU) is within the primary part of the FA PPDU, or 1 to indicate that an assigned RU is within a secondary part of the FA PPDU; an uplink bandwidth (UL BW) subfield of the common info field in the trigger frame is used to indicate a bandwidth of the primary part of the FA PPDU; and a UL BW extension subfield of a special user info field in the trigger frame is used together with the UL BW subfield in the common info field to indicate a bandwidth of a solicited TB PPDU from a specified EHT STA.

Example 6 includes the apparatus of Example 5, wherein a bandwidth of a transmitting (Tx) mask follows the UL BW extension subfield of the special user info field.

Example 7 includes the apparatus of Example 5, wherein: B56 of the common info field in the trigger frame is set to 1 to indicate a second PPDU in the secondary part of the FA PPDU as a HE PPDU, or 0 to indicate the second PPDU in the secondary primary part as an EHT PPDU.

Example 8 includes the apparatus of any of Examples 1-7, wherein the FA PPDU comprises a first PPDU in a primary part and a second PPDU in a secondary part, and both the primary part and the secondary part have a bandwidth of 160 megahertz (MHz).

Example 9 includes the apparatus of Example 8, wherein the first PPDU in the primary part is specified as a high-efficiency (HE) PPDU to be transmitted from a HE STA, and the second PPDU in the secondary part is specified as a HE PPDU to be transmitted from an extremely high throughput (EHT) STA.

Example 10 includes the apparatus of Example 8, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 160 MHz capable EHT STA.

Example 11 includes the apparatus of Example 8, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 320 MHz capable EHT STA.

Example 12 includes the apparatus of Example 8, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from another 160 MHz capable EHT STA.

Example 13 includes the apparatus of Example 8, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from a 320 MHz capable EHT STA.

Example 14 includes the apparatus of any of Examples 1-13, wherein the AP is an extremely high throughput (EHT) AP.

Example 15 includes an apparatus for a station (STA), comprising: a radio frequency (RF) interface; and processing circuitry coupled with the RF interface and configured to: process a trigger frame received via the RF interface from an access point (AP), wherein the trigger frame comprises signaling to indicate a configuration of FA PPDU for at least two STAs; determine whether the STA is one of the at least two STAs; and encode a composite trigger based (TB) PPDU in response to the trigger frame and as configured by the configuration of FA PPDU, when the STA is one of the at least two STAs, wherein the composite TB PPDU is to be aggregated with other composite TB PPDU(s) from other STAs of the at least two STAs.

Example 16 includes the apparatus of Example 15, wherein the processing circuitry is to determine whether the STA is one of the at least two STAs by checking whether a station identity (AID) of the STA is indicated by the signaling for the configuration of FA PPDU.

Example 17 includes the apparatus of Example 16, wherein the processing circuitry is configured to parse the signaling together with resource unit (RU) allocation signaling in a user info field matching the AID of the STA.

Example 18 includes the apparatus of any of Examples 15-17, wherein the configuration of FA-PPDU is determined by at least one of: each solicited composite TB PPDU; a bandwidth of each solicited composite TB PPDU; and a PPDU type of each solicited composite TB PPDU.

Example 19 includes the apparatus of any of Examples 15-18, wherein the STA is a high-efficiency (HE) STA, and the composite TB PPDU encoded by the HE STA is a HE PPDU.

Example 20 includes the apparatus of Example 19, wherein based on the configuration of FA PPDU, the HE PPDU is to be aggregated with one of: another HE PPDU from an extremely high throughput (EHT) STA; an EHT PPDU from a 160 megahertz (MHz) capable EHT STA; or an EHT PPDU from a 320 MHz capable EHT STA.

Example 21 includes the apparatus of any of Examples 15-18, wherein the STA is an extremely high throughput (EHT) STA, and the composite TB PPDU encoded by the EHT STA is a high-efficiency (HE) PPDU or an EHT PPDU.

Example 22 includes the apparatus of Example 21, wherein based on the configuration of FA PPDU: the HE PPDU encoded by the EHT STA is to be aggregated with another HE PPDU from a HE STA; or the EHT PPDU encoded by the EHT STA is to be aggregated with a HE PPDU from a HE STA, or another EHT PPDU from another EHT STA.

Example 23 includes the apparatus of Example 22, wherein the EHT STA comprises a 160 megahertz (MHz) capable EHT STA or a 320 MHz capable EHT STA.

Example 24 includes the apparatus of any of Examples 15-23, wherein: B54 of a common info field in the trigger frame is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU; B39 of a user info field in the trigger frame is set to 0 to indicate that an assigned resource unit (RU) is within the primary part of the FA PPDU, or 1 to indicate that an assigned RU is within a secondary part of the FA PPDU; an uplink bandwidth (UL BW) subfield of a common info field in the trigger frame is used to indicate a bandwidth of the primary part of the FA PPDU; and a UL BW extension subfield of a special user info field in the trigger frame is used together with the UL BW subfield in the common info field to indicate a bandwidth of a solicited TB PPDU from a specified EHT STA.

Example 25 includes the apparatus of Example 24, wherein: B56 of the common info field in the trigger frame is set to 1 to indicate a second PPDU in the secondary part of the FA PPDU as a HE PPDU, or 0 to indicate the second PPDU in the secondary primary part as an EHT PPDU.

Example 26 includes a non-transitory computer-readable storage medium having instructions stored thereon, which when executed by a processor of an access point (AP), cause the AP to encode a trigger frame to be transmitted to stations (STAs) communicatively connected with the AP, wherein the trigger frame comprises signaling to indicate a configuration of frequency domain aggregated (FA) physical layer protocol data unit (PPDU) for at least two STAs; and decode an FA PPDU aggregated by composite trigger based (TB) PPDUs from the at least two STAs.

Example 27 includes the non-transitory computer-readable storage medium of Example 26, wherein the signaling specifies each of the at least two STAs using a station identity (AID) of the STA.

Example 28 includes the non-transitory computer-readable storage medium of Example 26 or 27, wherein for each of the composite TB PPDUs, one or more resource units (RUs) are allocated to one or more STAs.

Example 29 includes the non-transitory computer-readable storage medium of any of Examples 26-28, wherein the configuration of FA-PPDU is determined by at least one of: each solicited composite TB PPDU; a bandwidth of each solicited composite TB PPDU; and a PPDU type of each solicited composite TB PPDU.

Example 30 includes the non-transitory computer-readable storage medium of any of Examples 26-29, wherein: B54 of a common info field in the trigger frame is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU; B39 of a user info field in the trigger frame is set to 0 to indicate that an assigned resource unit (RU) is within the primary part of the FA PPDU, or 1 to indicate that an assigned RU is within a secondary part of the FA PPDU; an uplink bandwidth (UL BW) subfield of the common info field in the trigger frame is used to indicate a bandwidth of the primary part of the FA PPDU; and a UL BW extension subfield of a special user info field in the trigger frame is used together with the UL BW subfield in the common info field to indicate a bandwidth of a solicited TB PPDU from a specified EHT STA.

Example 31 includes the non-transitory computer-readable storage medium of Example 30, wherein a bandwidth of a transmitting (Tx) mask follows the UL BW extension subfield of the special user info field.

Example 32 includes the non-transitory computer-readable storage medium of Example 30, wherein: B56 of the common info field in the trigger frame is set to 1 to indicate a second PPDU in the secondary part of the FA PPDU as a HE PPDU, or 0 to indicate the second PPDU in the secondary primary part as an EHT PPDU.

Example 33 includes the non-transitory computer-readable storage medium of any of Examples 26-32, wherein the FA PPDU comprises a first PPDU in a primary part and a second PPDU in a secondary part, and both the primary part and the secondary part have a bandwidth of 160 megahertz (MHz).

Example 34 includes the non-transitory computer-readable storage medium of Example 33, wherein the first PPDU in the primary part is specified as a high-efficiency (HE) PPDU to be transmitted from a HE STA, and the second PPDU in the secondary part is specified as a HE PPDU to be transmitted from an extremely high throughput (EHT) STA.

Example 35 includes the non-transitory computer-readable storage medium of Example 33, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 160 MHz capable EHT STA.

Example 36 includes the non-transitory computer-readable storage medium of Example 33, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 320 MHz capable EHT STA.

Example 37 includes the non-transitory computer-readable storage medium of Example 33, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from another 160 MHz capable EHT STA.

Example 38 includes the non-transitory computer-readable storage medium of Example 33, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from a 320 MHz capable EHT STA.

Example 39 includes the non-transitory computer-readable storage medium of any of Examples 26-38, wherein the AP is an extremely high throughput (EHT) AP.

Example 40 includes a non-transitory computer-readable storage medium having instructions stored thereon, which when executed by a processor of a station (STA), cause the STA to: process a trigger frame received from an access point (AP), wherein the trigger frame comprises signaling to indicate a configuration of FA PPDU for at least two STAs; determine whether the STA is one of the at least two STAs; and encode a composite trigger based (TB) PPDU in response to the trigger frame and as configured by the configuration of FA PPDU, when the STA is one of the at least two STAs, wherein the composite TB PPDU is to be aggregated with other composite TB PPDU(s) from other STAs of the at least two STAs.

Example 41 includes the non-transitory computer-readable storage medium of Example 40, wherein the instructions cause the STA to determine whether the STA is one of the at least two STAs by checking whether a station identity (AID) of the STA is indicated by the signaling for the configuration of FA PPDU.

Example 42 includes the non-transitory computer-readable storage medium of Example 41, wherein the instructions cause the STA to parse the signaling together with resource unit (RU) allocation signaling in a user info field matching the AID of the STA.

Example 43 includes the non-transitory computer-readable storage medium of any of Examples 40-42, wherein the configuration of FA-PPDU is determined by at least one of: each solicited composite TB PPDU; a bandwidth of each solicited composite TB PPDU; and a PPDU type of each solicited composite TB PPDU.

Example 44 includes the non-transitory computer-readable storage medium of any of Examples 40-43, wherein the STA is a high-efficiency (HE) STA, and the composite TB PPDU encoded by the HE STA is a HE PPDU.

Example 45 includes the non-transitory computer-readable storage medium of Example 44, wherein based on the configuration of FA PPDU, the HE PPDU is to be aggregated with one of: another HE PPDU from an extremely high throughput (EHT) STA; an EHT PPDU from a 160 megahertz (MHz) capable EHT STA; or an EHT PPDU from a 320 MHz capable EHT STA.

Example 46 includes the non-transitory computer-readable storage medium of any of Examples 40-43, wherein the STA is an extremely high throughput (EHT) STA, and the composite TB PPDU encoded by the EHT STA is a high-efficiency (HE) PPDU or an EHT PPDU.

Example 47 includes the non-transitory computer-readable storage medium of Example 46, wherein based on the configuration of FA PPDU: the HE PPDU encoded by the EHT STA is to be aggregated with another HE PPDU from a HE STA; or the EHT PPDU encoded by the EHT STA is to be aggregated with a HE PPDU from a HE STA, or another EHT PPDU from another EHT STA.

Example 48 includes the non-transitory computer-readable storage medium of Example 47, wherein the EHT STA comprises a 160 megahertz (MHz) capable EHT STA or a 320 MHz capable EHT STA.

Example 49 includes the non-transitory computer-readable storage medium of any of Examples 40-48, wherein: B54 of a common info field in the trigger frame is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU; B39 of a user info field in the trigger frame is set to 0 to indicate that an assigned resource unit (RU) is within the primary part of the FA PPDU, or 1 to indicate that an assigned RU is within a secondary part of the FA PPDU; an uplink bandwidth (UL BW) subfield of a common info field in the trigger frame is used to indicate a bandwidth of the primary part of the FA PPDU; and a UL BW extension subfield of a special user info field in the trigger frame is used together with the UL BW subfield in the common info field to indicate a bandwidth of a solicited TB PPDU from a specified EHT STA.

Example 50 includes the non-transitory computer-readable storage medium of Example 49, wherein: B56 of the common info field in the trigger frame is set to 1 to indicate a second PPDU in the secondary part of the FA PPDU as a HE PPDU, or 0 to indicate the second PPDU in the secondary primary part as an EHT PPDU.

Example 51 includes a method to be performed by an access point (AP), comprising: transmitting a trigger frame to stations (STAs) communicatively connected with the AP, wherein the trigger frame comprises signaling to indicate a configuration of frequency domain aggregated (FA) physical layer protocol data unit (PPDU) for at least two STAs; and receiving an FA PPDU aggregated by composite trigger based (TB) PPDUs from the at least two STAs.

Example 52 includes the method of Example 51, wherein the signaling specifies each of the at least two STAs using a station identity (AID) of the STA.

Example 53 includes the method of Example 51 or 52, wherein for each of the composite TB PPDUs, one or more resource units (RUs) are allocated to one or more STAs.

Example 54 includes the method of any of Examples 51-53, wherein the configuration of FA-PPDU is determined by at least one of: each solicited composite TB PPDU; a bandwidth of each solicited composite TB PPDU; and a PPDU type of each solicited composite TB PPDU.

Example 55 includes the method of any of Examples 51-54, wherein: B54 of a common info field in the trigger frame is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU; B39 of a user info field in the trigger frame is set to 0 to indicate that an assigned resource unit (RU) is within the primary part of the FA PPDU, or 1 to indicate that an assigned RU is within a secondary part of the FA PPDU; an uplink bandwidth (UL BW) subfield of the common info field in the trigger frame is used to indicate a bandwidth of the primary part of the FA PPDU; and a UL BW extension subfield of a special user info field in the trigger frame is used together with the UL BW subfield in the common info field to indicate a bandwidth of a solicited TB PPDU from a specified EHT STA.

Example 56 includes the method of Example 55, wherein a bandwidth of a transmitting (Tx) mask follows the UL BW extension subfield of the special user info field.

Example 57 includes the method of Example 55, wherein: B56 of the common info field in the trigger frame is set to 1 to indicate a second PPDU in the secondary part of the FA PPDU as a HE PPDU, or 0 to indicate the second PPDU in the secondary primary part as an EHT PPDU.

Example 58 includes the method of any of Examples 51-57, wherein the FA PPDU comprises a first PPDU in a primary part and a second PPDU in a secondary part, and both the primary part and the secondary part have a bandwidth of 160 megahertz (MHz).

Example 59 includes the method of Example 58, wherein the first PPDU in the primary part is specified as a high-efficiency (HE) PPDU to be transmitted from a HE STA, and the second PPDU in the secondary part is specified as a HE PPDU to be transmitted from an extremely high throughput (EHT) STA.

Example 60 includes the method of Example 58, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 160 MHz capable EHT STA.

Example 61 includes the method of Example 58, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 320 MHz capable EHT STA.

Example 62 includes the method of Example 58, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from another 160 MHz capable EHT STA.

Example 63 includes the method of Example 58, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from a 320 MHz capable EHT STA.

Example 64 includes the method of any of Examples 51-63, wherein the AP is an extremely high throughput (EHT) AP.

Example 65 includes an apparatus for an access point (AP), comprising means for performing the method of any of Examples 51-64.

Example 66 includes a method to be performed by a station (STA), comprising: receiving a trigger frame from an access point (AP), wherein the trigger frame comprises signaling to indicate a configuration of FA PPDU for at least two STAs; determining whether the STA is one of the at least two STAs; and encoding a composite trigger based (TB) PPDU in response to the trigger frame and as configured by the configuration of FA PPDU, when the STA is one of the at least two STAs, wherein the composite TB PPDU is to be aggregated with other composite TB PPDU(s) from other STAs of the at least two STAs.

Example 67 includes the method of Example 66, comprising: determining whether the STA is one of the at least two STAs by checking whether a station identity (AID) of the STA is indicated by the signaling for the configuration of FA PPDU.

Example 68 includes the method of Example 67, further comprising: parsing the signaling together with resource unit (RU) allocation signaling in a user info field matching the AID of the STA.

Example 69 includes the method of any of Examples 66-68, wherein the configuration of FA-PPDU is determined by at least one of: each solicited composite TB PPDU; a bandwidth of each solicited composite TB PPDU; and a PPDU type of each solicited composite TB PPDU.

Example 70 includes the method of any of Examples 66-69, wherein the STA is a high-efficiency (HE) STA, and the composite TB PPDU encoded by the HE STA is a HE PPDU.

Example 71 includes the method of Example 70, wherein based on the configuration of FA PPDU, the HE PPDU is to be aggregated with one of: another HE PPDU from an extremely high throughput (EHT) STA; an EHT PPDU from a 160 megahertz (MHz) capable EHT STA; or an EHT PPDU from a 320 MHz capable EHT STA.

Example 72 includes the method of any of Examples 66-69, wherein the STA is an extremely high throughput (EHT) STA, and the composite TB PPDU encoded by the EHT STA is a high-efficiency (HE) PPDU or an EHT PPDU.

Example 73 includes the method of Example 72, wherein based on the configuration of FA PPDU: the HE PPDU encoded by the EHT STA is to be aggregated with another HE PPDU from a HE STA; or the EHT PPDU encoded by the EHT STA is to be aggregated with a HE PPDU from a HE STA, or another EHT PPDU from another EHT STA.

Example 74 includes the method of Example 73, wherein the EHT STA comprises a 160 megahertz (MHz) capable EHT STA or a 320 MHz capable EHT STA.

Example 75 includes the method of any of Examples 66-74, wherein: B54 of a common info field in the trigger frame is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU; B39 of a user info field in the trigger frame is set to 0 to indicate that an assigned resource unit (RU) is within the primary part of the FA PPDU, or 1 to indicate that an assigned RU is within a secondary part of the FA PPDU; an uplink bandwidth (UL BW) subfield of a common info field in the trigger frame is used to indicate a bandwidth of the primary part of the FA PPDU; and a UL BW extension subfield of a special user info field in the trigger frame is used together with the UL BW subfield in the common info field to indicate a bandwidth of a solicited TB PPDU from a specified EHT STA.

Example 76 includes the method of Example 75, wherein: B56 of the common info field in the trigger frame is set to 1 to indicate a second PPDU in the secondary part of the FA PPDU as a HE PPDU, or 0 to indicate the second PPDU in the secondary primary part as an EHT PPDU.

Example 77 includes an apparatus for a station (STA), comprising means for performing the method of any of Examples 66-75.

Example 78 includes a communication system, comprising the apparatus of any of claims 1-14, and the apparatus of any of Examples 15-25.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for an access point (AP), comprising:
a radio frequency (RF) interface; and
processing circuitry coupled with the RF interface and configured to:
encode a trigger frame to be transmitted via the RF interface to stations (STAs) communicatively connected with the AP, wherein the trigger frame comprises signaling to indicate a configuration of frequency domain aggregated (FA) physical layer protocol data unit (PPDU) for at least two STAs; and
decode an FA PPDU aggregated by composite trigger based (TB) PPDUs from the at least two STAs,
wherein the trigger frame includes a B54 bit in a common info field, and the B54 bit is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU;
the trigger frame includes a B39 bit in a user info field, and the B39 bit is set to 0 to indicate that an assigned resource unit (RU) is within the primary part of the FA PPDU, or 1 to indicate that an assigned RU is within a secondary part of the FA PPDU;
the trigger frame includes an uplink bandwidth (UL BW) subfield in the common info field, and the UL BW subfield is used to indicate a bandwidth of the primary part of the FA PPDU; and
the trigger frame includes a UL BW extension subfield in a special user info field, and the UL BW extension subfield is used together with the UL BW subfield to indicate a bandwidth of a solicited TB PPDU from a specified EHT STA.

2. The apparatus of claim 1, wherein the signaling specifies each of the at least two STAs using a station identity (AID) of the STA.

3. The apparatus of claim 1, wherein for each of the composite TB PPDUs, one or more resource units (RUs) are allocated to one or more STAs.

4. The apparatus of claim 1, wherein the configuration of FA-PPDU is determined by at least one of:
each solicited composite TB PPDU;
a bandwidth of each solicited composite TB PPDU; and
a PPDU type of each solicited composite TB PPDU.

5. The apparatus of claim 1, wherein a bandwidth of a transmitting (Tx) mask follows the UL BW extension subfield of the special user info field.

6. The apparatus of claim 1, wherein:
B56 of the common info field in the trigger frame is set to 1 to indicate a second PPDU in the secondary part of the FA PPDU as a HE PPDU, or 0 to indicate the second PPDU in the secondary part as an EHT PPDU.

7. The apparatus of claim 1, wherein the FA PPDU comprises the first PPDU in the primary part and a second PPDU in a secondary part, and both the primary part and the secondary part have a bandwidth of 160 megahertz (MHz).

8. The apparatus of claim 7, wherein the first PPDU in the primary part is specified as a high-efficiency (HE) PPDU to be transmitted from a HE STA, and the second PPDU in the secondary part is specified as a HE PPDU to be transmitted from an extremely high throughput (EHT) STA.

9. The apparatus of claim 7, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 160 MHz capable EHT STA.

10. The apparatus of claim 7, wherein the first PPDU in the primary part is specified as a high-efficiency (HE) PPDU to be transmitted from a HE STA, and the second PPDU in the secondary part is specified as an extremely high throughput (EHT) PPDU to be transmitted from a 320 MHz capable EHT STA.

11. The apparatus of claim 7, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from another 160 MHz capable EHT STA.

12. The apparatus of claim 7, wherein the first PPDU in the primary part is specified as an extremely high throughput (EHT) PPDU to be transmitted from a 160 MHz capable EHT STA, and the second PPDU in the secondary part is specified as another EHT PPDU to be transmitted from a 320 MHz capable EHT STA.

13. The apparatus of claim 1, wherein the AP is an extremely high throughput (EHT) AP.

14. An apparatus for a station (STA), comprising:
a radio frequency (RF) interface; and
processing circuitry coupled with the RF interface and configured to:
process a trigger frame received via the RF interface from an access point (AP), wherein the trigger frame comprises signaling to indicate a configuration of FA PPDU for at least two STAs;
determine whether the STA is one of the at least two STAs; and
encode a composite trigger based (TB) PPDU in response to the trigger frame and as configured by the configuration of FA PPDU, when the STA is one of the at least two STAs, wherein the composite TB PPDU is to be aggregated with other composite TB PPDU(s) from other STAs of the at least two STAs,
wherein the trigger frame includes a B54 bit in a common info field, and the B54 bit is set to 1 to indicate a first PPDU in a primary part of the FA PPDU as a high-efficiency (HE) PPDU, or 0 to indicate the first PPDU in the primary part of the FA PPDU as an extremely high throughput (EHT) PPDU;

the trigger frame includes a B39 bit in a user info field, and the B39 bit is set to 0 to indicate that an assigned resource unit (RU) is within the primary part of the FA PPDU, or 1 to indicate that an assigned RU is within a secondary part of the FA PPDU;

the trigger frame includes an uplink bandwidth (UL BW) subfield in the common info field, and the UL BW subfield is used to indicate a bandwidth of the primary part of the FA PPDU; and the trigger frame includes a UL BW extension subfield in a special user info field, and the UL BW extension subfield is used together with the UL BW subfield to indicate a bandwidth of a solicited TB PPDU from a specified EHT STA.

15. The apparatus of claim 14, wherein the processing circuitry is to determine whether the STA is one of the at least two STAs by checking whether a station identity (AID) of the STA is indicated by the signaling for the configuration of FA PPDU.

16. The apparatus of claim 15, wherein the processing circuitry is configured to parse the signaling together with resource unit (RU) allocation signaling in a user info field matching the AID of the STA.

17. The apparatus of claim 14, wherein the configuration of FA-PPDU is determined by at least one of:
each solicited composite TB PPDU;
a bandwidth of each solicited composite TB PPDU; and
a PPDU type of each solicited composite TB PPDU.

18. The apparatus of claim 14, wherein the STA is a high-efficiency (HE) STA, and the composite TB PPDU encoded by the HE STA is a HE PPDU.

19. The apparatus of claim 18, wherein based on the configuration of FA PPDU, the HE PPDU is to be aggregated with one of:
another HE PPDU from an extremely high throughput (EHT) STA;
an EHT PPDU from a 160 megahertz (MHz) capable EHT STA; or
an EHT PPDU from a 320 MHz capable EHT STA.

20. The apparatus of claim 14, wherein the STA is an extremely high throughput (EHT) STA, and the composite TB PPDU encoded by the EHT STA is a high-efficiency (HE) PPDU or an EHT PPDU.

21. The apparatus of claim 20, wherein based on the configuration of FA PPDU:
the HE PPDU encoded by the EHT STA is to be aggregated with another HE PPDU from a HE STA; or
the EHT PPDU encoded by the EHT STA is to be aggregated with a HE PPDU from a HE STA, or another EHT PPDU from another EHT STA.

22. The apparatus of claim 21, wherein the EHT STA comprises a 160 megahertz (MHz) capable EHT STA or a 320 MHz capable EHT STA.

23. The apparatus of claim 14, wherein:
B56 of the common info field in the trigger frame is set to 1 to indicate a second PPDU in the secondary part of the FA PPDU as a HE PPDU, or 0 to indicate the second PPDU in the secondary part as an EHT PPDU.

* * * * *